United States Patent
Okabe et al.

(10) Patent No.: US 11,400,994 B2
(45) Date of Patent: Aug. 2, 2022

(54) BATTERY ATTACHMENT/DETACHMENT STRUCTURE FOR SADDLE-RIDE TYPE ELECTRIC VEHICLE

(71) Applicant: HONDA MOTOR CO., LTD., Tokyo (JP)

(72) Inventors: Sadataka Okabe, Wako (JP); Akira Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/420,525

(22) PCT Filed: Jan. 7, 2020

(86) PCT No.: PCT/JP2020/000205
§ 371 (c)(1),
(2) Date: Jul. 2, 2021

(87) PCT Pub. No.: WO2020/194985
PCT Pub. Date: Oct. 1, 2020

(65) Prior Publication Data
US 2022/0081055 A1 Mar. 17, 2022

(30) Foreign Application Priority Data
Mar. 25, 2019 (JP) .............................. JP2019-057294

(51) Int. Cl.
*B62J 43/23* (2020.01)
*B60L 53/80* (2019.01)
(Continued)

(52) U.S. Cl.
CPC .............. *B62J 43/23* (2020.02); *B60L 50/66* (2019.02); *B60L 53/80* (2019.02); *B62J 1/12* (2013.01);
(Continued)

(58) Field of Classification Search
CPC ...... B62J 43/16; B62J 9/14; B62J 1/12; B60L 50/66; B60L 53/80; B60L 2200/12; B62M 7/12
See application file for complete search history.

(56) References Cited

U.S. PATENT DOCUMENTS 6,624,610 B1    9/2003  Ono et al.
8,602,139 B2 *  12/2013 Takamura ............... B60L 50/66
                                                    180/65.1
(Continued)

FOREIGN PATENT DOCUMENTS

CN          1172353 A       2/1998
CN        104512516 A       4/2015
(Continued)

OTHER PUBLICATIONS

Extended European search report dated Dec. 14, 2021 in the corresponding EP Patent Application No. 20776702.1.
(Continued)

*Primary Examiner* — Tony H Winner
(74) *Attorney, Agent, or Firm* — Carrier Blackman & Associates, P.C.; Joseph P. Carrier; Jeffrey T. Gedeon

(57) ABSTRACT

A battery attachment/detachment structure for a saddle-ride type electric vehicle includes substantially rectangular parallelepiped batteries for supplying electric power to an electric motorcycle, a battery case in which the batteries are housed, a battery-side terminal provided on the bottom surface of each battery, and a case-side terminal engaged with the battery-side terminal. An operation lever for connecting or separating the battery-side terminal and the case-side terminal to/from each other by being operated in the up-and-down direction of a vehicle body, and a locking member for holding the operation lever at a position where the battery-side terminal and the case-side terminal are connected to each other are provided. The locking member (Continued)

regulates the movement of the operation lever towards the upper side of the vehicle body by engaging with the operation lever. The disclosed structure can regulate the movement of housed batteries to maintain excellent electrical connection with a simple configuration.

20 Claims, 15 Drawing Sheets

(51) Int. Cl.
*B62J 9/14* (2020.01)
*B62J 43/16* (2020.01)
*B60L 50/60* (2019.01)
*B62J 1/12* (2006.01)
*B62M 7/12* (2006.01)

(52) U.S. Cl.
CPC ............... *B62J 9/14* (2020.02); *B62J 43/16* (2020.02); *B60L 2200/12* (2013.01); *B62M 7/12* (2013.01)

(56) References Cited

U.S. PATENT DOCUMENTS

| 9,598,132 | B2* | 3/2017 | Eguchi | B62K 19/12 |
| 10,611,425 | B2* | 4/2020 | Miyashiro | B62K 11/04 |
| 2012/0103716 | A1* | 5/2012 | Fujihara | B62J 43/28 |
| | | | | 180/220 |
| 2015/0122569 | A1* | 5/2015 | Miyashiro | B62J 43/16 |
| | | | | 180/220 |
| 2020/0295327 | A1 | 9/2020 | Onishi et al. | |

FOREIGN PATENT DOCUMENTS

| EP | 0 970 881 A2 | 1/2000 |
| EP | 1 389 552 A1 | 2/2004 |
| EP | 2 623 404 A1 | 8/2013 |
| EP | 2 913 261 A1 | 9/2015 |
| EP | 3 670 313 A1 | 6/2020 |
| JP | H11-34957 A | 2/1999 |
| JP | H11-129959 A | 5/1999 |
| JP | 2000-079893 A | 3/2000 |
| JP | 2004-345450 A | 12/2004 |
| JP | 2008-228507 A | 9/2008 |
| JP | 2011-152900 A | 8/2011 |
| JP | 2013-208935 A | 10/2013 |
| JP | 2015-164819 A | 9/2015 |
| JP | 2019-164976 A | 9/2019 |
| WO | 2012/043518 A1 | 4/2012 |
| WO | 2019/064606 A1 | 4/2019 |
| WO | 2019/235381 A1 | 12/2019 |

OTHER PUBLICATIONS

PCX Electric, Honda Motor Co., Ltd., Nov. 2018, URL https://www.honda.co.jp/factbook/motor/PCX/201811/, p. 5, non-official translation (PCX Electric Product Manual).

Office Action dated Mar. 1, 2022 in the corresponding Chinese Patent Application No. 202080010257.9 with the English translation thereof.

* cited by examiner

BATTERY ATTACHMENT/DETACHMENT STRUCTURE FOR SADDLE-RIDE TYPE ELECTRIC VEHICLE

TECHNICAL FIELD

The present invention relates to a battery attachment/detachment structure for a saddle-ride type electric vehicle, and more particularly to a battery attachment/detachment structure for a saddle-ride type electric vehicle applied to portable batteries detachably housed in a vehicle body of the saddle-ride type electric vehicle and a housing part thereof.

BACKGROUND ART

In recent years, the development of a saddle-ride type electric vehicle that travels by driving a motor using electric power of in-vehicle batteries has been progressing. In such a saddle-ride type electric vehicle, a configuration of facilitating charging, maintenance, and the like by applying portable batteries removable from a vehicle body has been known.

Patent Literature 1 discloses a configuration in which two batteries are housed at a lower portion of an openable/closable seat in a scooter-type electric vehicle having a low floor between a steering handlebar and the seat. Substantially rectangular parallelepiped batteries that are long in the up-and-down direction of the vehicle body are housed in two housing concave portions disposed adjacent to each other in the longitudinal direction of the vehicle body, and are accommodated at predetermined positions so that battery-side connection terminals and vehicle-body-side connection terminals are engaged with each other.

CITATION LIST

Patent Literature

Patent Literature 1: WO 2012/043518 A

SUMMARY OF INVENTION

Problem to be Solved by Invention

Here, in the configuration in which the connection terminals are engaged with each other by housing the batteries in the housing concave portions as in Patent Literature 1, it is preferable to provide a mechanism for holding the housed batteries at predetermined positions so as not to affect the electrical connections due to the movement of the batteries towards the upper side of the vehicle body when riding across a large step. Further, in the configuration of Patent Literature 1, it is also conceivable that the seat is closed in a state where the battery-side connection terminals and the vehicle-body-side connection terminals are not sufficiently connected to each other.

The object of the present invention is to solve the problem of the prior art and to provide a battery attachment/detachment structure for a saddle-ride type electric vehicle capable of regulating the movement of housed batteries and maintaining excellent electrical connections with a simple configuration.

Solution to Problem

In order to achieve the above-described object, the present invention has a first feature in that a battery attachment/detachment structure for an electric motorcycle configured by including substantially rectangular parallelepiped batteries (B) for supplying electric power to a saddle-ride type electric vehicle (1), a battery case (40) in which the batteries (B) are housed, a battery-side terminal (78) provided on the bottom surface of each battery (B), and a case-side terminal (75) engaged with the battery-side terminal (78), wherein an operation lever (60) for connecting or separating the battery-side terminal (78) and the case-side terminal (75) to/from each other by being operated in the up-and-down direction of a vehicle body, and a locking member (50) for holding the operation lever (60) at a position where the battery-side terminal (78) and the case-side terminal (75) are connected to each other are provided.

In addition, the present invention has a second feature in that the battery case (40) is configured to be covered at an upper portion of a housing part (29) of the batteries (B) by closing an openable/closable seat (23) on which an occupant sits, the locking member (50) is configured to regulate the movement of the operation lever (60) towards the upper side of the vehicle body by engaging with the operation lever (60), and in a state where the locking member (50) is not engaged with the operation lever (60), a bottom plate (80) of the seat (23) is configured to interfere with the locking member (50) so as not to close the seat (23).

In addition, the present invention has a third feature in that the locking member (50) is provided with an engagement plate (52) that is brought into contact with the upper surface of the operation lever (60) when engaging with the operation lever (60), an engagement convex portion (52a) is formed on the lower surface of the engagement plate (52), an engagement concave portion (64a) in which the engagement convex portion (52a) is accommodated is formed on the upper surface of the operation lever (60), and the locking member (50) is configured to be swingable between a lock position engaged with the operation lever (60) and an unlock position separated from the operation lever (60).

In addition, the present invention has a fourth feature in that a rubber member (49) brought into contact with the locking member (50) in the unlock position is attached to the bottom plate (80) of the seat (23).

In addition, the present invention has a fifth feature in that a single urging member (54) is attached to the locking member (50), and the urging member (54) applies an urging force for swinging the locking member (50) to the lock position side in the range near the lock position, and applies an urging force for swinging the locking member (50) to the unlock position side in the range near the unlock position.

In addition, the present invention has a sixth feature in that if the seat (23) is closed when the locking member (50) is in the lock position, a part of the bottom plate (80) of the seat (23) comes close to the front of the vehicle body of the locking member (50).

In addition, the present invention has a seventh feature in that a seat catch mechanism (44) for holding the seat (23) in a closed state is arranged at a position near the rear side of the vehicle body of the battery case (40), and the locking member (60) is arranged near the front side of the vehicle body of the battery case (40) and on the rear side of the vehicle body of a hinge mechanism (39) of the seat (23).

In addition, the present invention has an eighth feature in that the two batteries (B) are housed next to each other in the vehicle width direction in the battery case (40), the operation lever (60) is configured in such a manner that a grip part (61) is positioned above between the two batteries (B) in a state where the batteries (B) are housed in the battery case (40), swing-type pressing holders (41) for pressing the upper surfaces of the batteries (B) and a terminal holder (73) for supporting the case-side terminal (75) so as to be movable between a connection position connected to the battery-side terminal (78) and a retreat position separated from the battery-side terminal (78) are provided, and the batteries (B) are accommodated in the battery case (40) and the operation lever (60) is pushed downward, so that the pressing holders (41) are configured to be swung to press the upper surfaces of the batteries (B).

Advantageous Effects of Invention

According to the first feature, the battery attachment/detachment structure for the electric motorcycle configured by including the substantially rectangular parallelepiped batteries (B) for supplying electric power to the saddle-ride type electric vehicle (1), the battery case (40) in which the batteries (B) are housed, the battery-side terminal (78) provided on the bottom surface of each battery (B), and the case-side terminal (75) engaged with the battery-side terminal (78), wherein the operation lever (60) for connecting or separating the battery-side terminal (78) and the case-side terminal (75) to/from each other by being operated in the up-and-down direction of the vehicle body, and the locking member (50) for holding the operation lever (60) at a position where the battery-side terminal (78) and the case-side terminal (75) are connected to each other are provided. Thus, it is possible to hold the state in which the battery-side terminal and the case-side terminal are connected to each other by regulating the operation of the operation lever with the locking member. Accordingly, even when riding across a large step during traveling, it is possible to maintain an excellent connection state between the battery-side terminal and the case-side terminal.

According to the second feature, the battery case (40) is configured to be covered at an upper portion of the housing part (29) of the batteries (B) by closing the openable/closable seat (23) on which an occupant sits, the locking member (50) is configured to regulate the movement of the operation lever (60) towards the upper side of the vehicle body by engaging with the operation lever (60), and in a state where the locking member (50) is not engaged with the operation lever (60), the bottom plate (80) of the seat (23) is configured to interfere with the locking member (50) so as not to close the seat (23). Thus, in a state where the locking member is not engaged with the operation lever, the seat cannot be closed, and thus it is possible to prevent the saddle-ride type electric vehicle from traveling in a state where the connection between the battery-side terminal and the case-side terminal is uncertain.

According to the third feature, the locking member (50) is provided with the engagement plate (52) that is brought into contact with the upper surface of the operation lever (60) when engaging with the operation lever (60), the engagement convex portion (52a) is formed on the lower surface of the engagement plate (52), the engagement concave portion (64a) in which the engagement convex portion (52a) is accommodated is formed on the upper surface of the operation lever (60), and the locking member (50) is configured to be swingable between the lock position engaged with the operation lever (60) and the unlock position separated from the operation lever (60). Thus, the operability can be improved by employing the swing-type locking member, and the engagement plate of the locking member and the operation lever are engaged with each other through the concave and convex structures, so that the engagement state between the operation lever and the locking member can be stably maintained even when riding across a large step during traveling.

According to the fourth feature, the rubber member (49) brought into contact with the locking member (50) in the unlock position is attached to the bottom plate (80) of the seat (23). Thus, it is possible to improve the feeling of the closing operation of the seat by reducing the impact and sound generated when the bottom plate of the seat is brought into contact with the locking member in the unlock position, and the locking member can be protected.

According to the fifth feature, the single urging member (54) is attached to the locking member (50), and the urging member (54) applies an urging force for swinging the locking member (50) to the lock position side in the range near the lock position, and applies an urging force for swinging the locking member (50) to the unlock position side in the range near the unlock position. Thus, the operation of the locking member can be facilitated by applying the urging force of the urging member, and the locking member can be stably held at each of the lock position and the unlock position.

According to the sixth feature, if the seat (23) is closed when the locking member (50) is in the lock position, a part of the bottom plate (80) of the seat (23) comes close to the front of the vehicle body of the locking member (50). Thus, the locking member is regulated from swinging to the unlock position side by closing the seat, so that the engagement state between the operation lever and the locking member can be stably maintained even when riding across a large step during traveling.

According to the seventh feature, the seat catch mechanism (44) for holding the seat (23) in a closed state is arranged at a position near the rear side of the vehicle body of the battery case (40), and the locking member (60) is arranged near the front side of the vehicle body of the battery case (40) and on the rear side of the vehicle body of the hinge mechanism (39) of the seat (23). Thus, it is possible to prevent the battery case from being enlarged by arranging the locking member using a dead space near the front side of the vehicle body. In addition, when a worker stands on the left side of the electric motorcycle, the operation lever can be easily operated with the right hand, and the locking member can be easily operated with the left hand. Thus, the attachment/detachment work of the batteries can be smoothly performed.

According to the eighth feature, the two batteries (B) are housed next to each other in the vehicle width direction in the battery case (40), the operation lever (60) is configured in such a manner that the grip part (61) is positioned above between the two batteries (B) in a state where the batteries (B) are housed in the battery case (40), the swing-type pressing holders (41) for pressing the upper surfaces of the batteries (B) and the terminal holder (73) for supporting the case-side terminal (75) so as to be movable between the connection position connected to the battery-side terminal (78) and the retreat position separated from the battery-side terminal (78) are provided, and the batteries (B) are accommodated in the battery case (40) and the operation lever (60) is pushed downward, so that the pressing holders (41) are configured to be swung to press the upper surfaces of the batteries (B). Thus, the batteries are housed in the battery case and the operation lever is pushed down, so that it is possible to obtain a configuration in which the pressing holders press the upper surfaces of the batteries and the operation lever is brought into contact with the pressing holders. Namely, the swing operation of the pressing holders is regulated by the operation lever, so that even when riding across a large step, excellent electrical connection can be maintained by preventing the batteries from moving towards the upper side of the vehicle body.

DESCRIPTION OF EMBODIMENT

Figure 1:
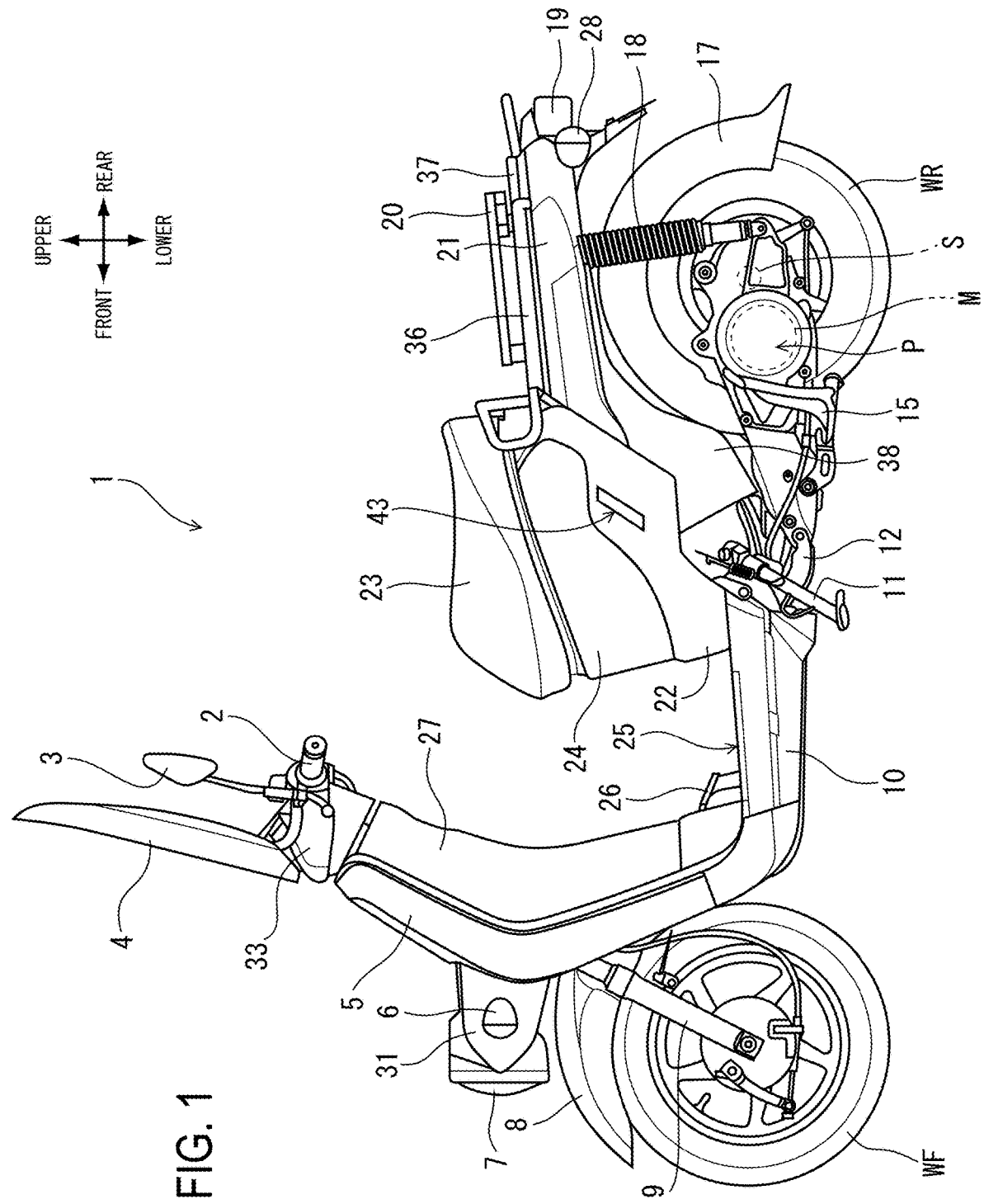
FIG. 1 is a left side view of an electric motorcycle according to an embodiment of the present invention.

Hereinafter, preferred embodiments of the present invention will be described in detail with reference to the drawings. FIG. 1 is a left side view of an electric motorcycle 1 as a saddle-ride type electric vehicle according to an embodiment of the present invention. The electric motorcycle 1 is a so-called scooter-type electric vehicle in which a low floor 25 for putting the feet of an occupant is provided between a steering handlebar 2 and a seat 23.

A pair of left and right front forks 9, in the vehicle width direction, for pivotally supporting a front wheel WF to be rotatable is swingable by the steering handlebar 2 extended in the vehicle width direction. A rearview mirror 3 and a windbreak screen 4 are attached to a handle cover 33 covering the front and rear of the steering handlebar 2. A front cover 5 on the front side of the vehicle body and a floor panel 27 facing the legs of the occupant on the rear side of the vehicle body of the front cover 5 are arranged below the handle cover 33. A headlight 7 and a pair of left and right front-side flasher lamps 6, which are supported by a light stay 31, are arranged in front of the front cover 5. A front fender 8 covering above the front wheel WF is supported between the left and right front forks 9.

A brake pedal 26 for actuating a brake device of a rear wheel WR is arranged on the upper surface of the low floor 25, and an undercover 10 continued to a lower end of the front cover 5 is arranged at a lower portion of the low floor 25. A seat lower cowl 24 having a curved shape projecting on the front side of the vehicle body is arranged below the seat 23 on which a driver sits. A floor upper cover 22 coupled to a lower portion of the seat lower cowl 24 is provided with a pair of left and right slits 43 for positively taking in a traveling wind from the front of the vehicle body.

A side stand 11 is arranged behind the undercover 10 of the vehicle body. A pair of rear cowls 21 is arranged in the vehicle width direction behind the floor upper cover 22, and a loading platform 37 and a rear carrier 20 surrounded by a grip pipe 36 are arranged at upper portions of the rear cowls 21. A taillight device 19 and a pair of left and right rear-side flasher lamps 28 are arranged behind the rear cowls 21.

A swing unit type power unit P for pivotally supporting the rear wheel WR to be rotatable through an axle is arranged behind the undercover 10. The power unit P incorporating a motor M for driving the rear wheel WR is swingably attached to a vehicle body frame through a link mechanism 12. A rear portion of the power unit P is suspended from the vehicle body frame by a rear cushion 18, and a rear fender 17 covering above the rear wheel WR is attached to an upper portion of the power unit P. A cover member 38 for receiving a traveling wind introduced from the slits 43 of the seat lower cowl 24 and a traveling wind flowing inside the undercover 10 is arranged at a position between the seat lower cowl 24 and the rear fender 17.

Figure 2:
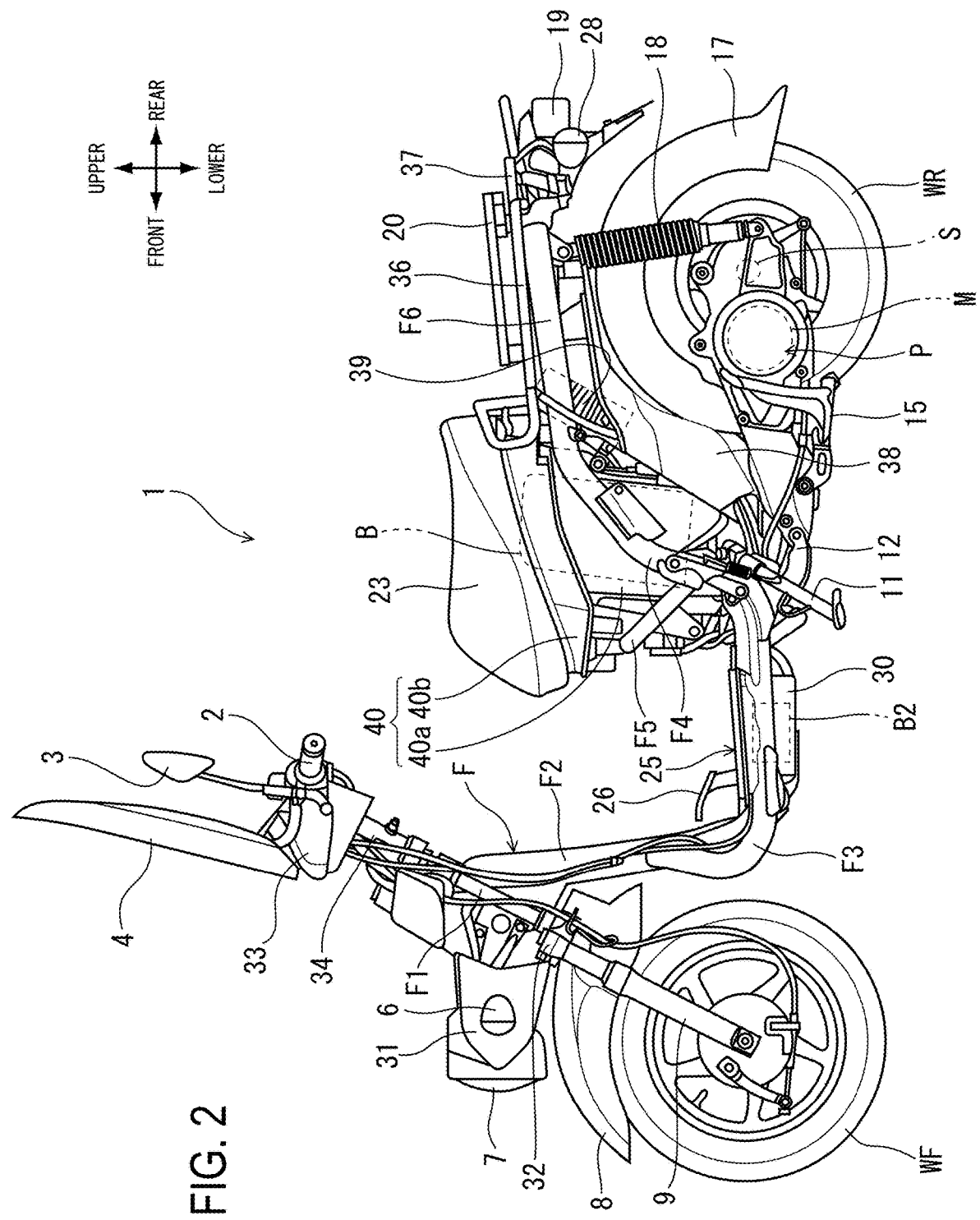
FIG. 2 is a left side view of the electric motorcycle in a state where main exterior parts are removed.

FIG. 2 is a left side view of the electric motorcycle 1 in a state where main exterior parts are removed. A vehicle body frame F of the electric motorcycle 1 has a main frame F2 in the middle in the vehicle width direction extending towards the lower side of the vehicle body from a head pipe F1, a pair of left and right underframes F3 coupled to a lower end of the main frame F2 and curved towards the rear side of the vehicle body, rising portions F4 directed towards the upper rear side of the vehicle body from rear ends of the underframes F3, and a pair of left and right rear frames F6 continued to the rising portions F4 and extending towards the rear side of the vehicle body. A curved pipe F5 for coupling the left and right rising portions F4 to each other is coupled to front portions of the rising portions F4.

A steering stem 34 is pivotally supported to be rotatable by the head pipe F1. The steering handlebar 2 is fixed to an upper end of the steering stem 34, and a bottom bridge 32 for supporting upper ends of the front forks 9 is fixed to a lower end of the steering stem 34. A battery case 40 for housing two batteries (high-voltage batteries) B, which supply electric power to the motor M, next to each other in the vehicle width direction is arranged below the seat 23. The battery case 40 consists of a vertically long lower-side case 40a matching the shape of the batteries B and an upper-side case 40b coupled to an upper portion of the lower-side case 40a and forming an opening matching the bottom shape of the seat 23. The seat 23 is pivotally supported to be openable and closable at an upper portion of a front end of the battery case 40, and functions as an opening and closing cover of the battery case 40.

The battery case 40 is accommodated in a space between the pair of left and right rising portions F4 behind the curved pipe F5. The seat lower cowl 24 (see FIG. 1) extends from the front of the curved pipe F5 up to the sides of the left and right rising portions F4 so as to cover the front and sides of the battery case 40. A housing case 30 for housing electric components such as a low-voltage sub-battery B2 for supplying electric power to auxiliaries such as the headlight 7 and a fuse is arranged below the low floor 25.

The cover member 38 for receiving a traveling wind from the front of the vehicle body in front of the rear fender 17 is arranged on the rear surface side of the battery case 40, and a PCU (power control unit) 39 for controlling electric power supply to the motor M is arranged at a position near the upper side on the rear surface side of the battery case 40.

Figure 3:
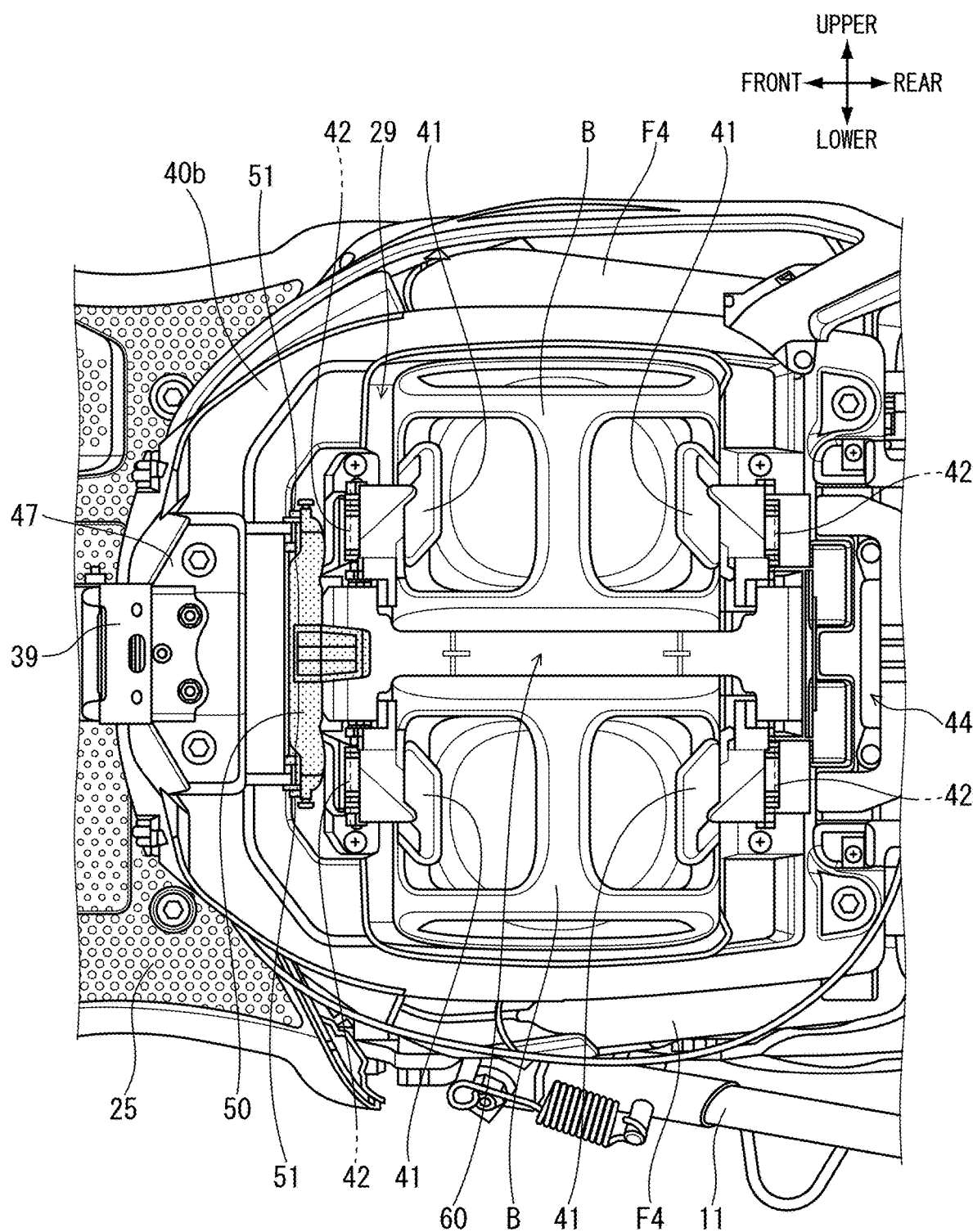
FIG. 3 is a partially enlarged plan view of the electric motorcycle with a seat removed.
Figure 4:
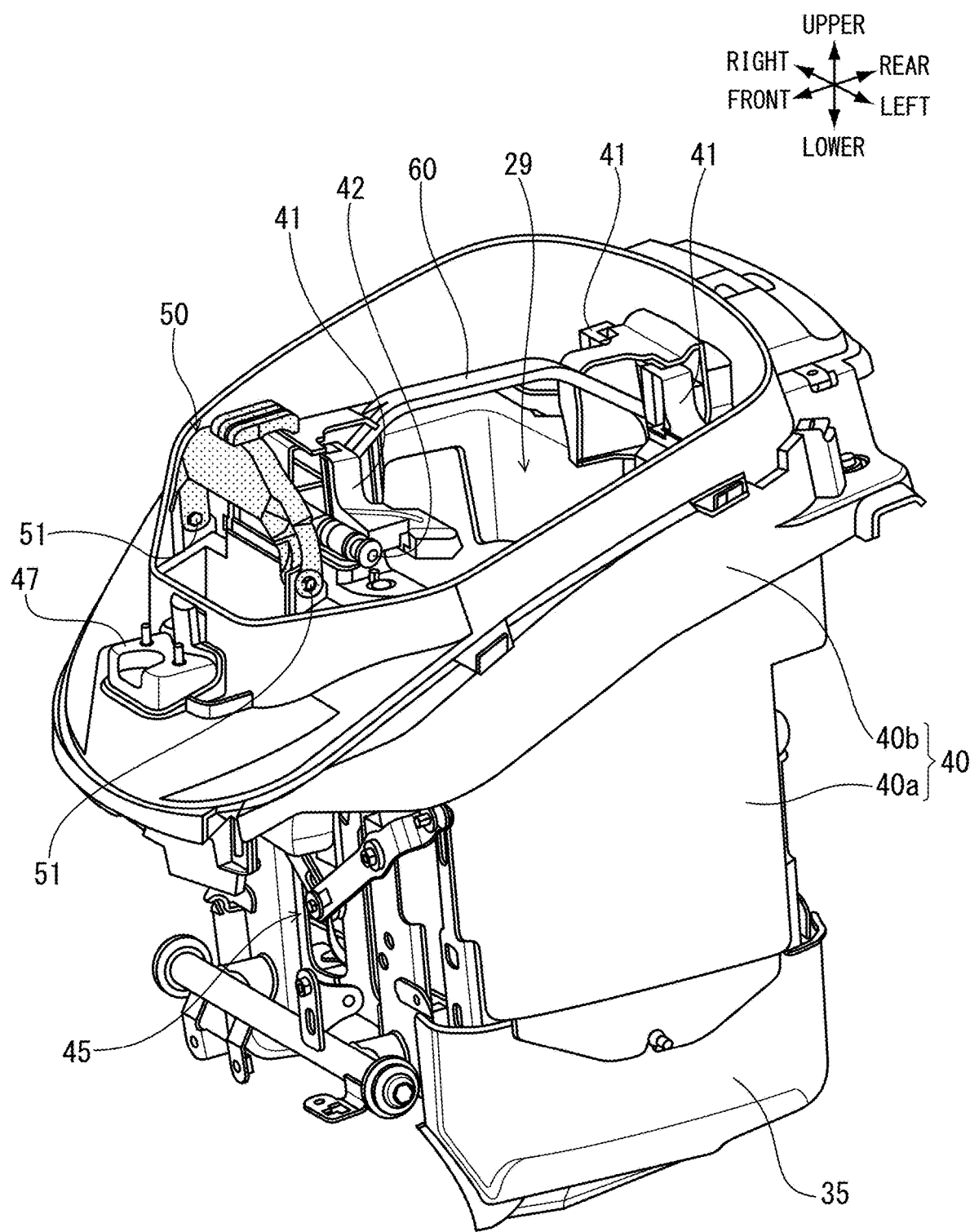
FIG. 4 is a perspective view of a battery case with batteries removed.

FIG. 3 is a partially enlarged plan view of the electric motorcycle 1 with the seat 23 removed. In addition, FIG. 4 is a perspective view of the battery case 40 with the batteries B removed. In the battery case 40 formed by combining the lower-side case 40a and the upper-side case 40b to each other, a housing part 29 into which the two batteries B disposed close to each other in the vehicle width direction are inserted is formed. A hinge mechanism 39 for pivotally supporting the seat 23 to be openable and closable is attached to a pedestal 47 provided in front of the housing part 29.

An operation lever 60 gripped by a worker by hand and moved up and down is arranged between the left and right batteries B. When the operation lever 60 is pulled up upward, the batteries B can be detached from the battery case 40, while when the operation lever 60 is pushed down, contact points of the batteries B and contact points of the vehicle body are electrically connected to each other and the batteries B are held at predetermined positions.

Pressing holders 41 for pressing the upper surfaces of the batteries B are arranged at front and rear positions of the housing part 29. Urging force on one side is applied by an urging member to each pressing holder 41 pivotally supported to be swingable by a swing axis 42, and each pressing holder 41 is configured so as to erect in the vertical direction by being pushed up by the operation lever 60 after pulling up the operation lever 60 while the upper surfaces of the batteries B are pressed by the urging force in a state where the operation lever 60 is pushed down. The contact surfaces of the pressing holders 41 that press the upper surfaces of the batteries B are formed using buffer members such as rubber.

Further, a locking member 50 pivotably supported to be swingable by swing axes 51 arranged at the upper-side case 40b is arranged in front of the operation lever 60. The locking member 50 is engaged with the upper surface of the operation lever 60 by erecting in the vertical direction and has a function of regulating the upward movement of the operation lever 60.

Referring to FIG. 4, a link mechanism 45 that is interlocked with the operation lever 60 is arranged on the front surface of the lower-side case 40a. The link mechanism 45 has a function of connecting a battery-side terminal and a case-side terminal to each other by pushing down the operation lever 60 and separating the case-side terminal from the battery-side terminal by pulling up the operation lever 60. A protection cover 35 covering the connection portions of the terminals is provided at a lower end of the lower-side case 40a.

Figure 5:
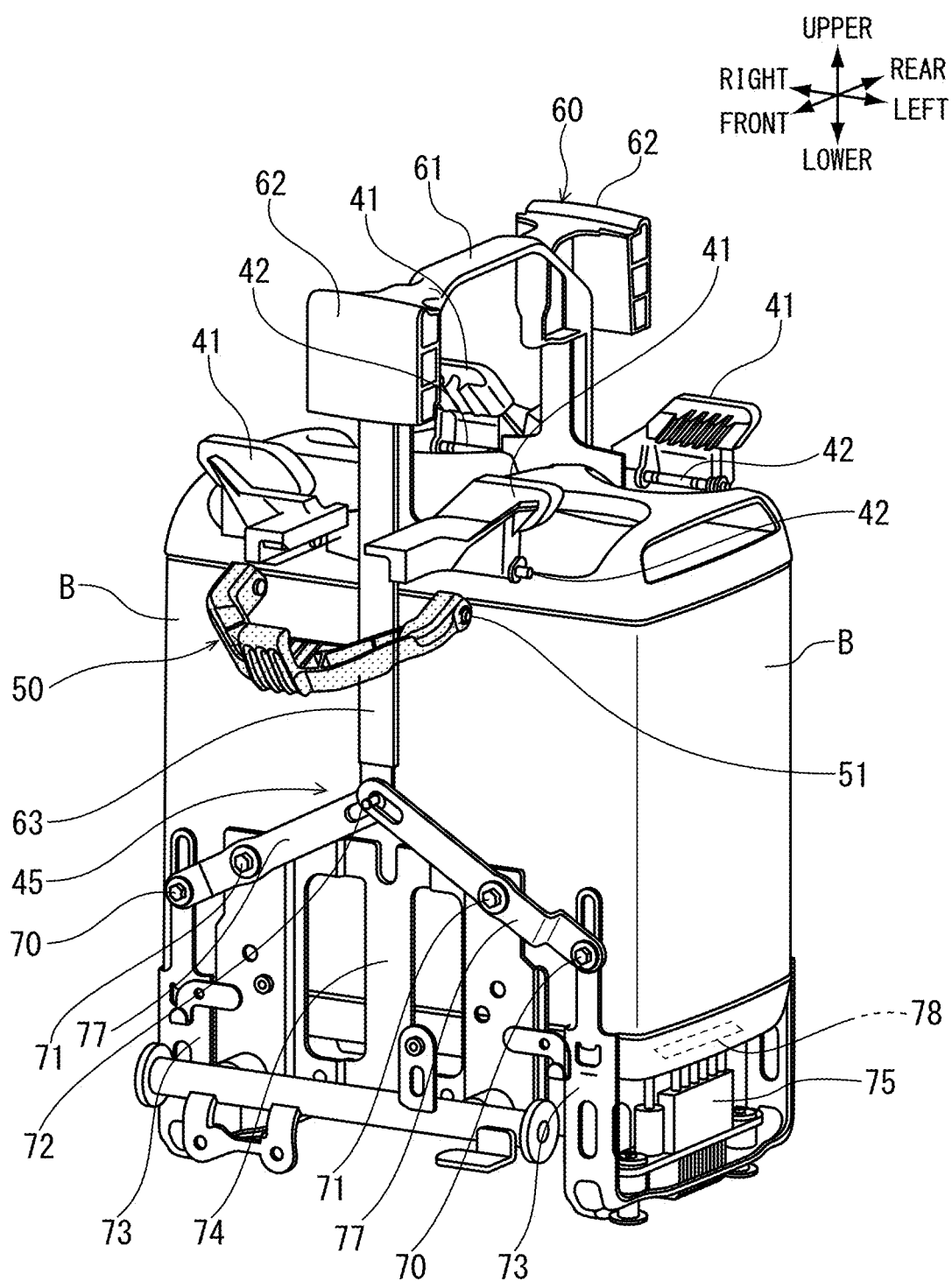
FIG. 5 is a perspective view for showing a relationship between the batteries and a link mechanism (operation lever lifting state).
Figure 6:
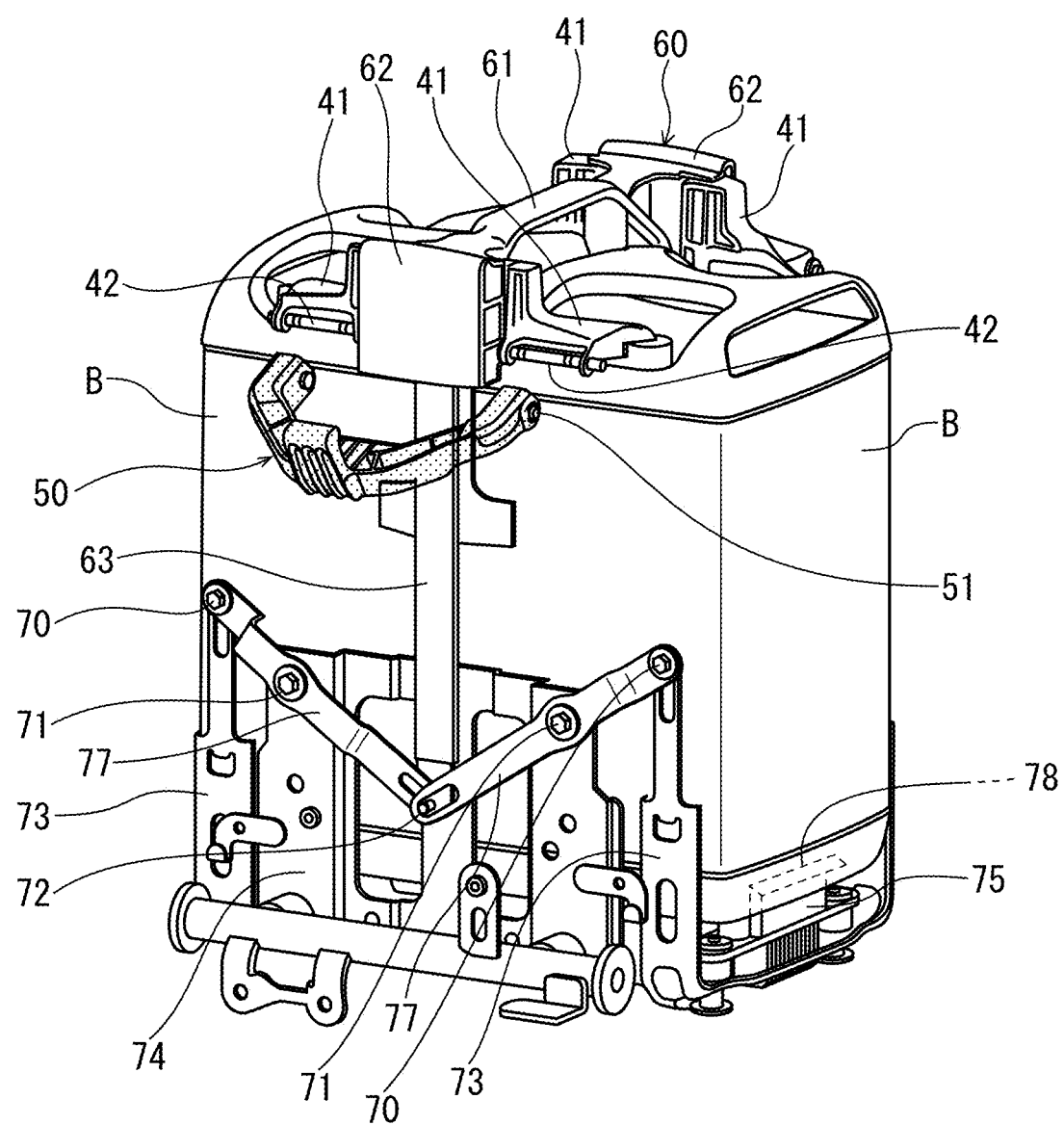
FIG. 6 is a perspective view for showing a relationship between the batteries and the link mechanism (operation lever depressed state).
Figure 7:
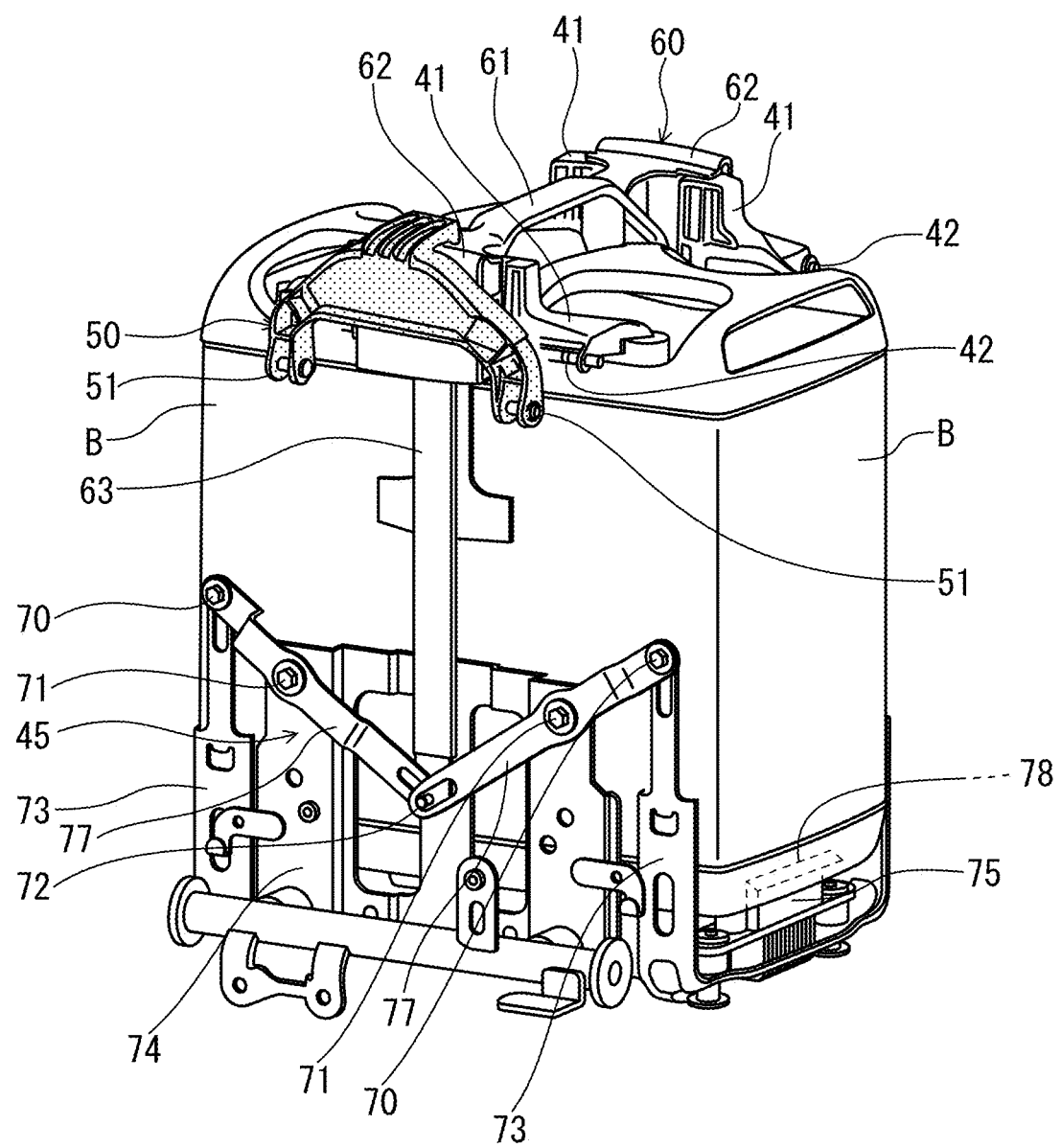
FIG. 7 is a perspective view for showing a relationship between the batteries and the link mechanism (locking member engaged state).

FIGS. 5, 6, and 7 are perspective views each showing a relationship between the batteries B and the link mechanism 45. FIG. 5 shows a state in which the operation lever 60 is pulled up and the batteries B can be attached and detached, FIG. 6 shows a state in which the operation lever 60 is pushed down and a battery-side terminal 78 and a case-side terminal 75 are connected to each other, and FIG. 7 shows a state in which the locking member 50 is engaged with the operation lever 60 being pushed down. The locking member 50 in each drawing has the same function as the locking member 50 shown in FIGS. 3 and 4.

The operation lever 60 is configured in such a manner that support parts 62 coming close to the inside of the pressing holders 41 in the vehicle width direction when the operation lever 60 is pushed down are provided in front of and behind a grip part 61 gripped by a worker, and operators 63 for actuating the link mechanism 45 are extended from lower portions of the support parts 62.

An engagement pin 72 engaged with an elongate hole formed at an inner end of each of a pair of left and right link arms 77 in the vehicle width direction is provided at a lower end of each operator 63. Each link arm 77 is pivotally supported to be swingable to a base plate 74 fixed to the lower-side case 40a through a swing axis 71. An actuating axis 70 provided at an outer end of each link arm 77 in the vehicle width direction is coupled to an upper end of each terminal holder 73 for supporting the case-side terminal 75.

In FIG. 5, the terminal holders 73 are positioned on the lower side of the vehicle body by pulling up the operation lever 60. At this time, the case-side terminal 75 is separated downward from the battery-side terminal 78 provided on the bottom surface of each battery B, and the pressing holders 41 are erected, so that the batteries B can be attached and detached. In FIG. 6, the terminal holders 73 are positioned on the upper side of the vehicle body by pushing down the operation lever 60. At this time, the case-side terminal 75 is connected to the battery-side terminal 78, and the pressing holders 41 swing and are brought into contact with the upper surfaces of the batteries B, so that the batteries B are held at predetermined positions. Further, as shown in FIG. 7, when the locking member 50 is swung to be engaged with the operation lever 60, the upward movement of the operation lever 60 is inhibited.

As described above, according to the battery attachment/detachment structure according to the present invention, since the operation lever 60 for connecting or separating the battery-side terminal 78 and the case-side terminal 75 to/from each other by being operated in the up-and-down direction of the vehicle body and the locking member 50 for holding the operation lever 60 at a position where the battery-side terminal 78 and the case-side terminal 75 are connected to each other are provided, it is possible to hold the state in which the battery-side terminal 78 and the case-side terminal 75 are connected to each other by regulating the operation of the operation lever 60 with the locking member 50. Accordingly, even when riding across a large step during traveling, it is possible to maintain an excellent connection state between the battery-side terminal 78 and the case-side terminal 75.

Figure 8:
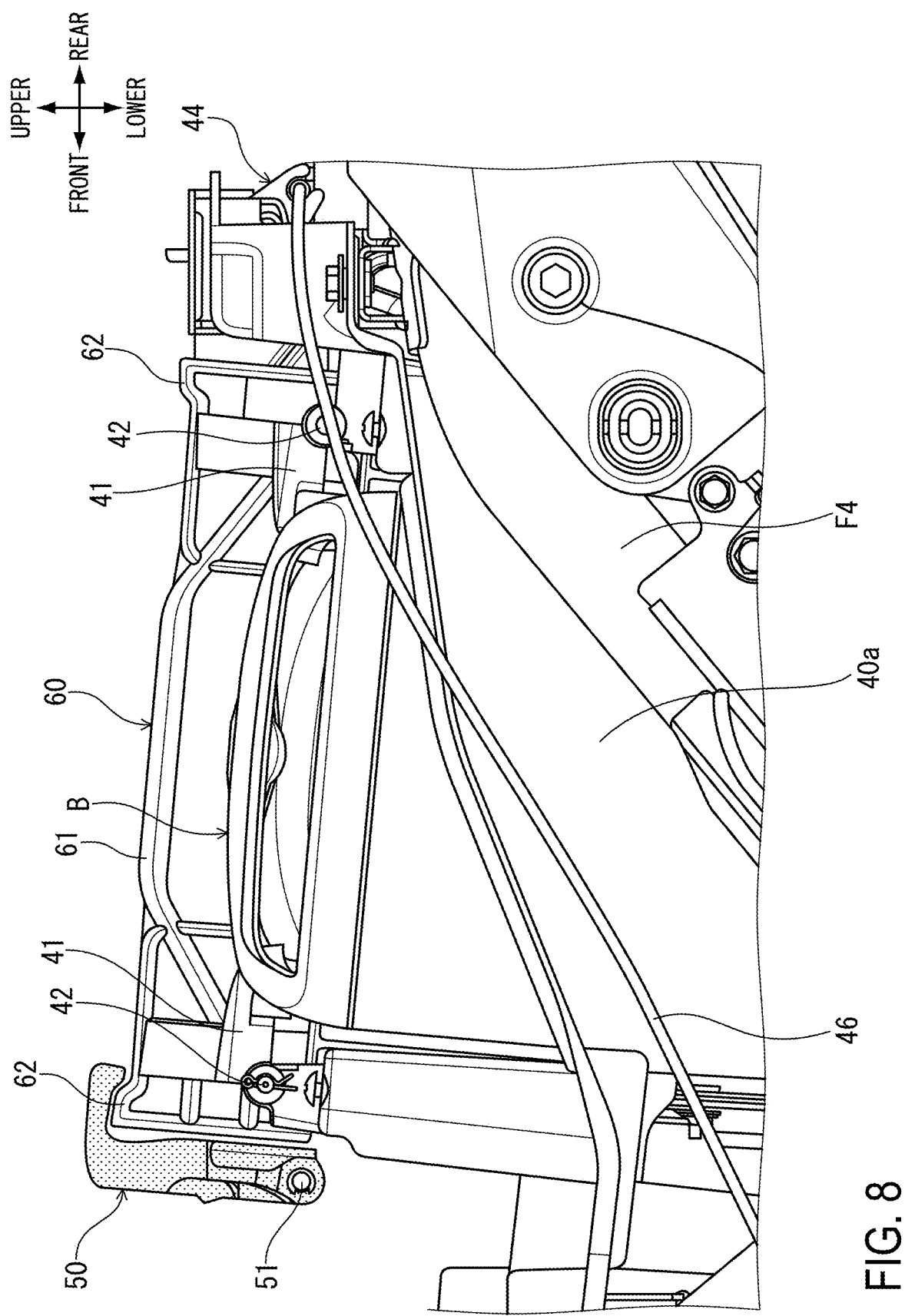
FIG. 8 is a left side view for showing an arrangement position of the locking member with respect to the operation lever.

FIG. 8 is a left side view for showing an arrangement position of the locking member 50 with respect to the operation lever 60. This drawing shows a state in which the batteries B are housed, the locking member 50 is engaged with the operation lever 60, and the upper-side case 40b supporting the locking member 50 is removed. As described above, the operation lever 60 is configured in such a manner that the support parts 62 for supporting the operators 63 are provided in front of and behind the grip part 61. The grip part 61 of the operation lever 60 is arranged in parallel with the upper surfaces of the batteries B that are housed while being inclined slightly rearward with respect to the vertical direction.

A seat catch mechanism 44 actuated by a traction operation of a cable 46 is adjacently disposed behind the support part 62 on the rear side of the vehicle body. The locking member 50 pivotally supported by the upper-side case 40b is adjacently disposed in front of the support part 62 on the front side of the vehicle body so as to avoid the seat catch mechanism 44. Accordingly, it is possible to prevent the battery case 40 from being enlarged by arranging the locking member 50 using a dead space in front of the support part 62. In addition, when a worker stands on the left side of the electric motorcycle 1, the operation lever 60 can be easily operated with the right hand, and the locking member 50 can be easily operated with the left hand. Thus, the attachment/detachment work of the batteries B can be smoothly performed.

Figure 9:
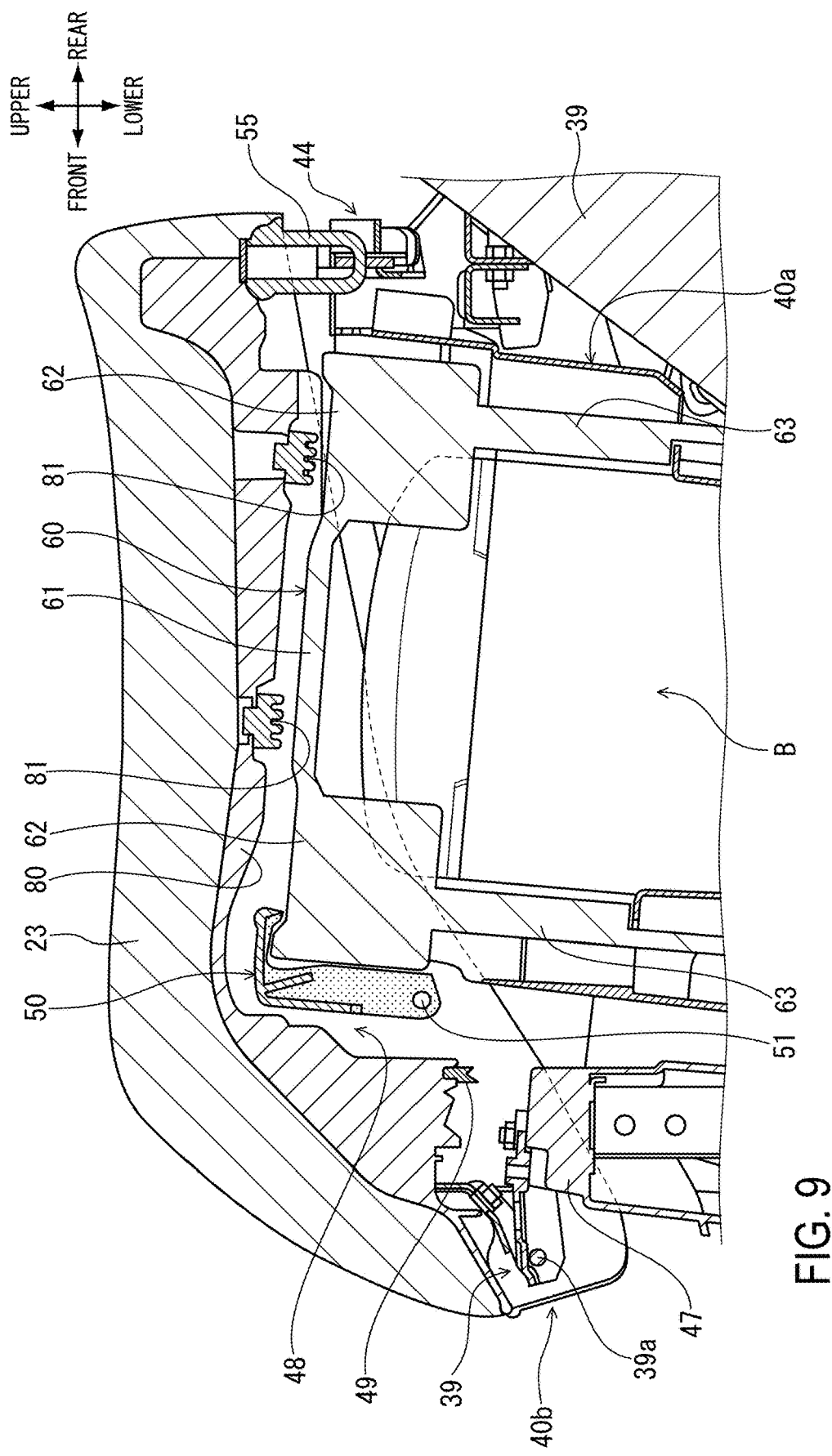
FIG. 9 is a cross-sectional view for showing a state in which the batteries are housed in the battery case and the seat is closed.

FIG. 9 is a cross-sectional view for showing a state in which the batteries B are housed in the battery case 40 and the seat 23 is closed. A seat bottom plate 80 formed of resin or the like is attached to the hinge mechanism 39 fixed to the pedestal 47 of the upper-side case 40b. A hook 55 made of metal or the like is provided at a rear end of the seat bottom plate 80, and is engaged with the seat catch mechanism 44 to hold the seat 23 in a closed state.

A concave portion 48 in which the locking member 50 engaged with the operation lever 60 is accommodated when the seat 23 is closed is formed at a position near the front side of the seat bottom plate 80. The wall surface of the concave portion 48 on the front side of the vehicle body is formed in a staircase shape close to the locking member 50, and has a function of accommodating the locking member 50 at a predetermined engagement position in such a manner that in a state where the locking member 50 is not completely engaged with the support part 62, the locking member 50 is pushed towards the rear side of the vehicle body while the wall surface comes into contact with the locking member 50 in accordance with the closing operation of the seat 23.

On the other hand, a rubber member 49 that is brought into contact with the upper surface of the locking member 50 swung towards the front side of the vehicle body when the seat 23 is to be closed in a state where the locking member 50 is released is provided in front of a lower end of the concave portion 48. In addition, a cushion member 81 for receiving the operation lever 60 on the upper side even when the operation lever 60 moves upward by any chance is attached to the seat bottom plate 80 above the operation lever 60.

Figure 10:
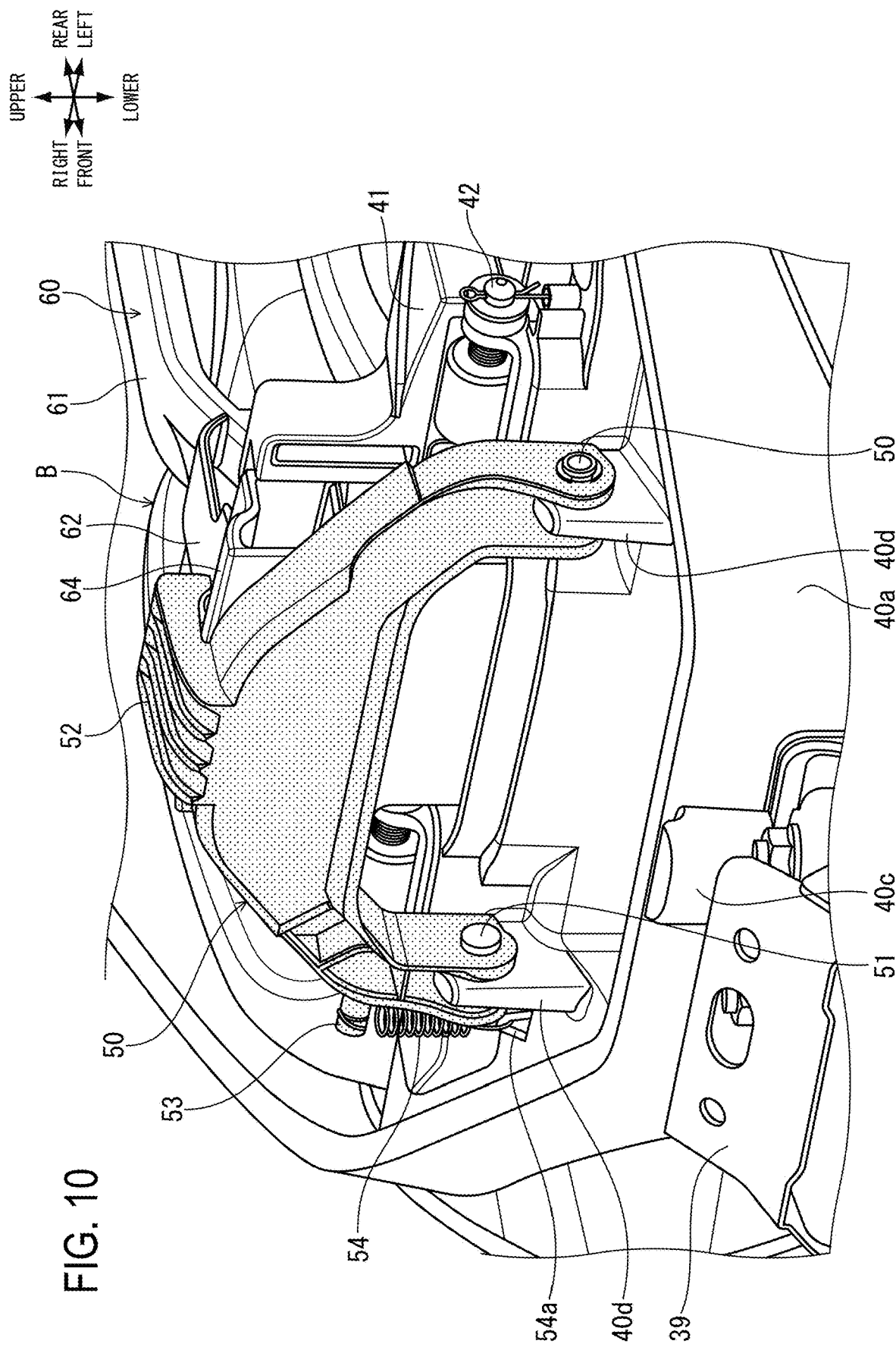
FIG. 10 is a perspective view for showing the locking member and a peripheral structure thereof.
Figure 11:
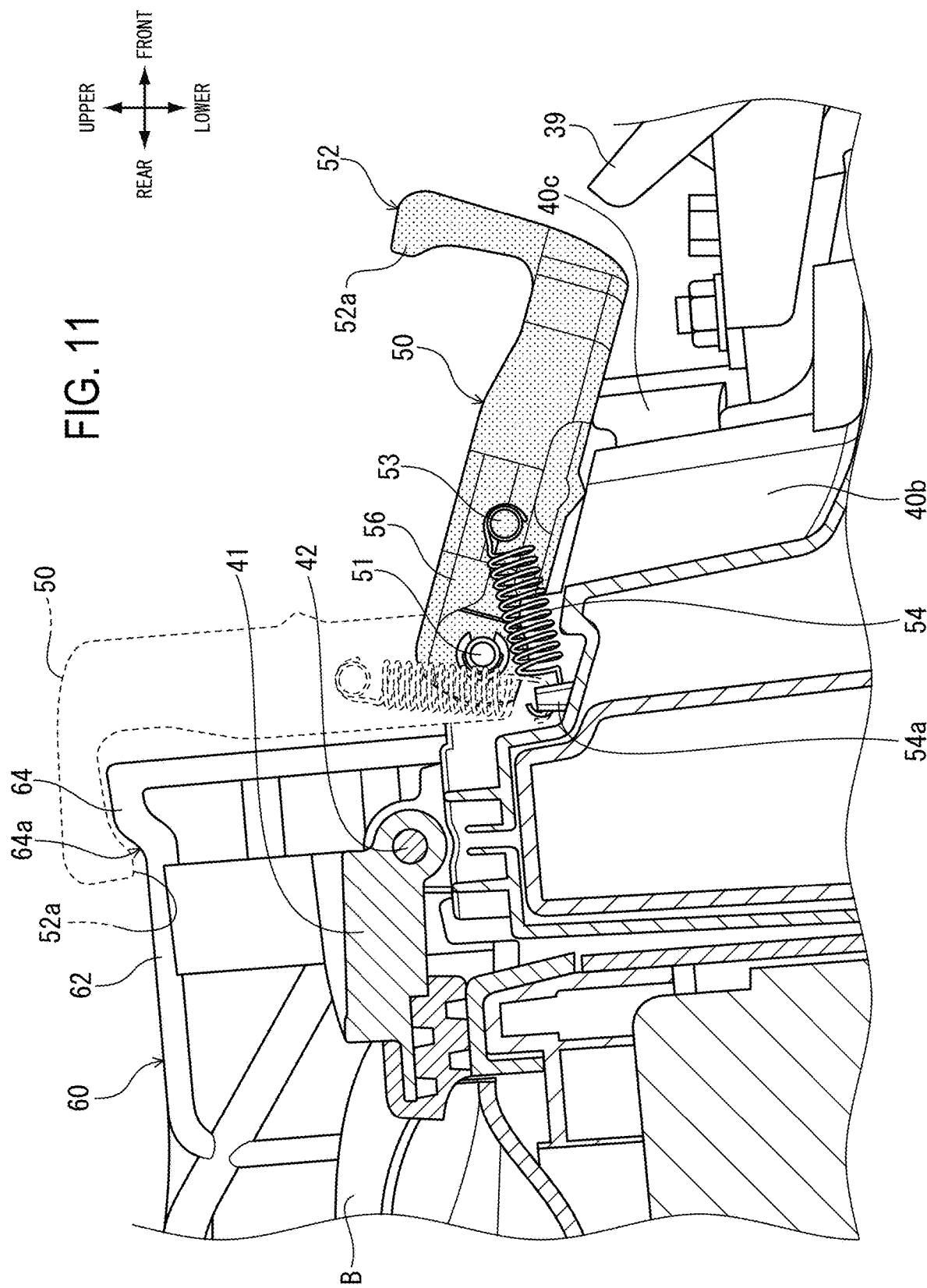
FIG. 11 is a side view for showing an engagement structure between the locking member and a support part.

FIG. 10 is a perspective view for showing the locking member 50 and a peripheral structure thereof. In addition, FIG. 11 is a side view for showing an engagement structure between the locking member 50 and the support part 62. The locking member 50 is pivotally supported by a pair of left and right support plates 40d provided at the upper-side case 40b, and is configured to be swingable between an unlock position where the locking member 50 swings towards the front side of the vehicle body and is brought into contact with an edge portion 40c of the upper-side case 40b and a lock position where the locking member 50 erects in the vertical direction and is engaged with the support part 62. The locking member 50 includes arm parts 56 extending upward from the left and right swing axes 51 and forming a substantially A-shape and an engagement plate 52 fixed to an upper end of the arm part 56 and directed towards the rear side of the vehicle body. In a state where the arm parts 56 are erected, an engagement convex portion 52a directed towards the lower side of the vehicle body is formed at a position of a rear end of the engagement plate 52.

On the other hand, an engagement concave portion 64a formed by providing a bulging portion 64 is formed on the upper surface of the support part 62 of the operation lever 60, and when the locking member 50 is erected, the engagement convex portion 52a of the engagement plate 52 is accommodated in the engagement concave portion 64a of the support part 62, so that the engagement state between the locking member 50 and the support part 62 is stably held. The locking member 50 can be formed of metal such as hard resin or aluminum.

The arm part 56 on the right side in the vehicle width direction is provided with a round bar-like stay member 53, and one end of a spring hook 54 the other end of which is supported by a support part 54a provided at the upper-side case 40b is engaged with the stay member 53. The spring hook 54 as an urging member applies an urging force for swinging the locking member 50 to the lock position side in the range near the lock position, and applies an urging force for swinging the locking member 50 to the unlock position side in the range near the unlock position. Accordingly, the urging force of the spring hook 54 is applied to facilitate the operation of the locking member 50, and the locking member 50 can be stably held at each of the lock position and the unlock position.

Figure 12:
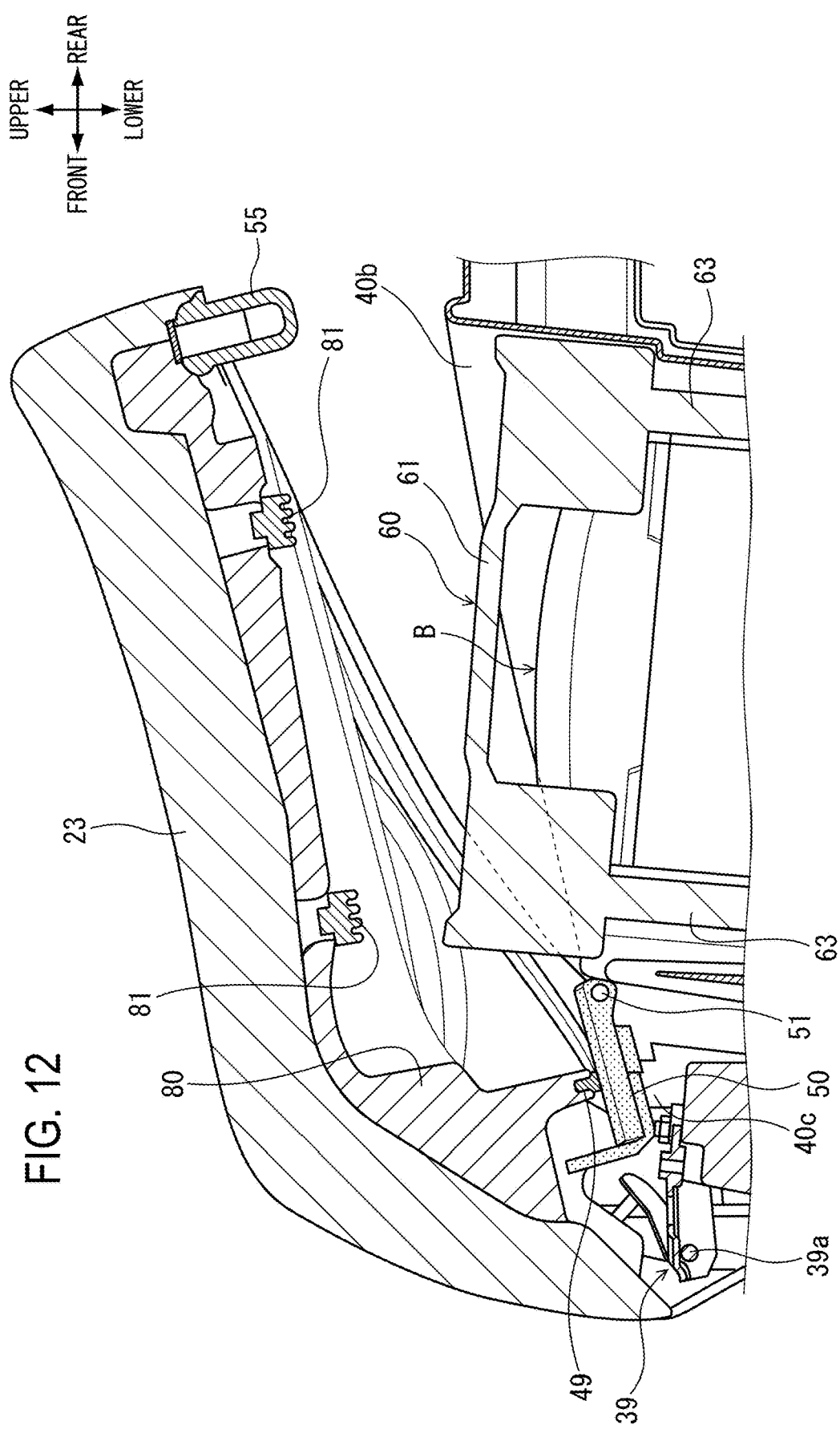
FIG. 12 is a cross-sectional view for showing a state in which the seat is closed when the locking member is in the unlock position.

FIG. 12 is a cross-sectional view for showing a state in which the seat 23 is closed when the locking member 50 is in the unlock position. As described above, the locking member 50 in the unlock position is brought into contact with the edge portion 40c of the upper-side case 40b by the urging force of the spring hook 54. If the seat 23 is closed in this state, the seat 23 does not swing at the time the rubber member 49 provided at the seat bottom plate 80 is brought into contact with the locking member 50, and it is possible to prompt the worker to operate the locking member 50. By providing the rubber member 49, the shock at the time of closing the seat 23 is buffered, and the upper surface of the locking member 50 can be protected.

Figure 13:
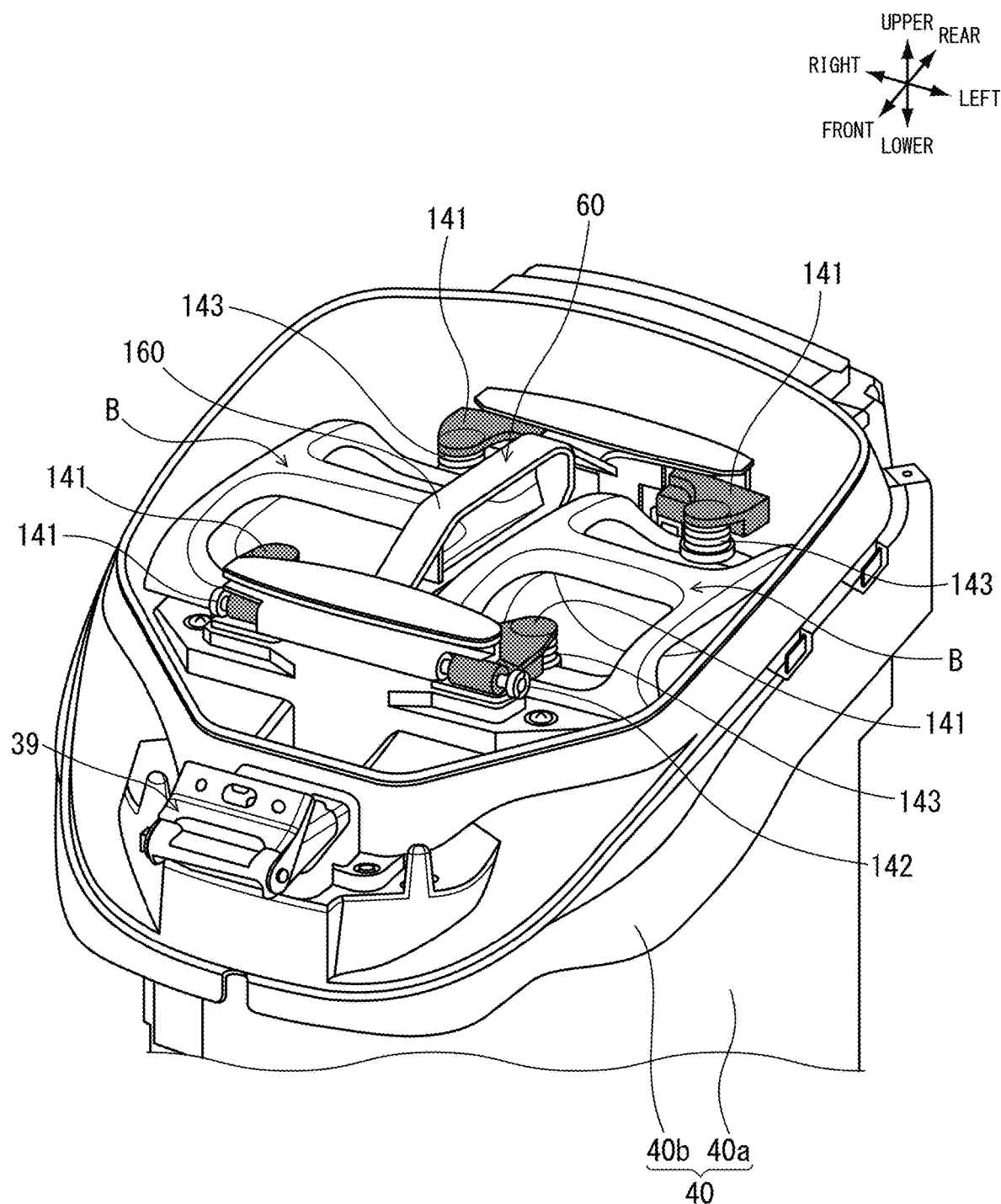
FIG. 13 is a perspective view for showing a configuration of pressing holders according to a modified example of the present invention.

FIG. 13 is a perspective view for showing a configuration of pressing holders 141 according to a modified example of the present invention. The pressing holders 141 (gray colored parts shown in the drawing) pivotally supported by the upper-side case 40b through a swing axis 142 are characterized in that whereas the contact surfaces of the above-described pressing holders 41 with the batteries B are formed of rubber or the like, spring members 143 are used to apply an urging force to the upper surfaces of the batteries B. According to this configuration, although the function of preventing the batteries B from deviating in the longitudinal and horizontal directions is lower than that of rubber or the like, the function of regulating the movement of the batteries B in the up-and-down direction and the impact absorbing property in the up-and-down direction are enhanced. The spring members can be configured using coil springs or plate springs, or a buffer material made of rubber or the like may be provided at a part brought into contact with the upper surfaces of the batteries B.

Figure 14:
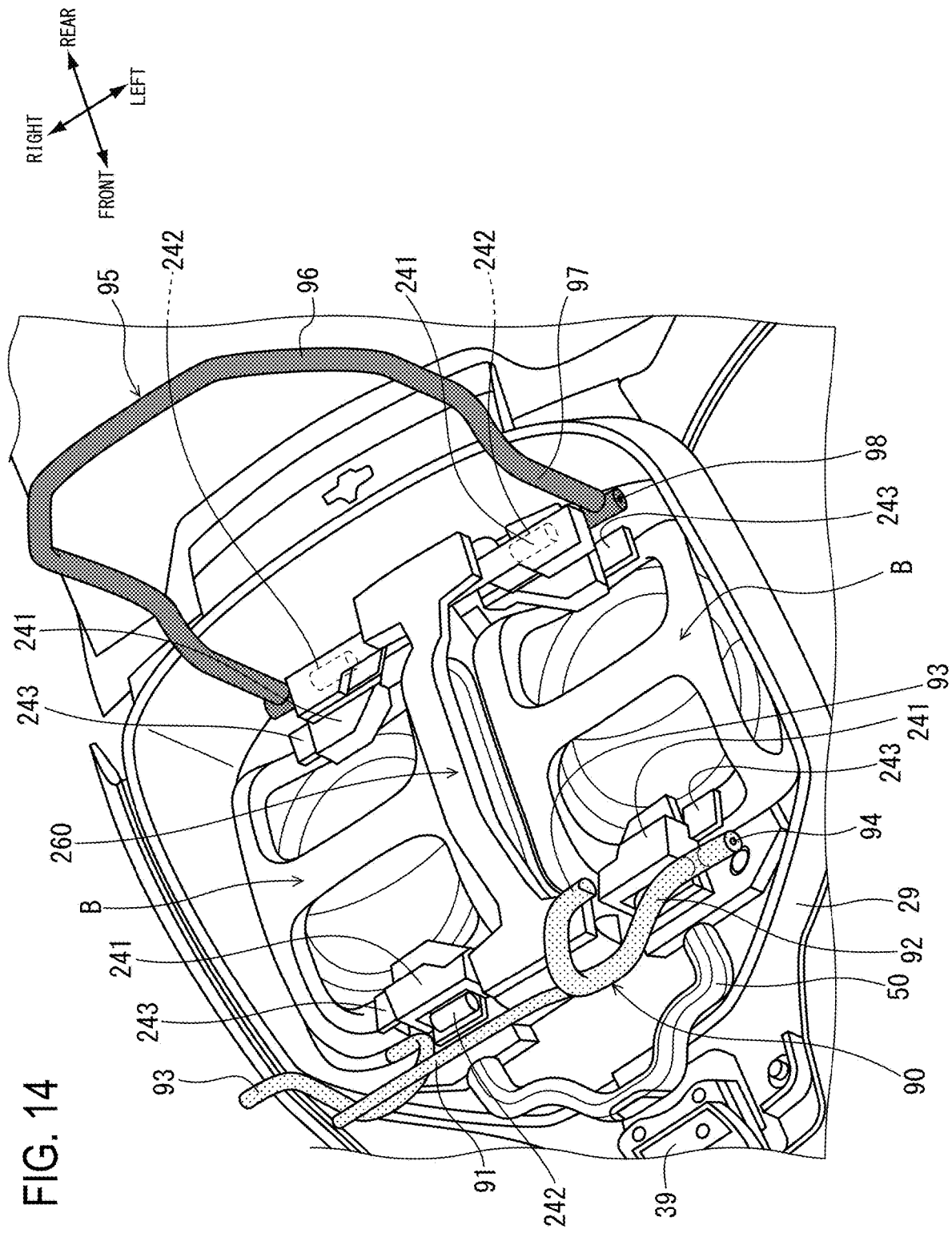
FIG. 14 is a perspective view for showing a configuration of lock arms according to a second embodiment of the present invention.
Figure 15:
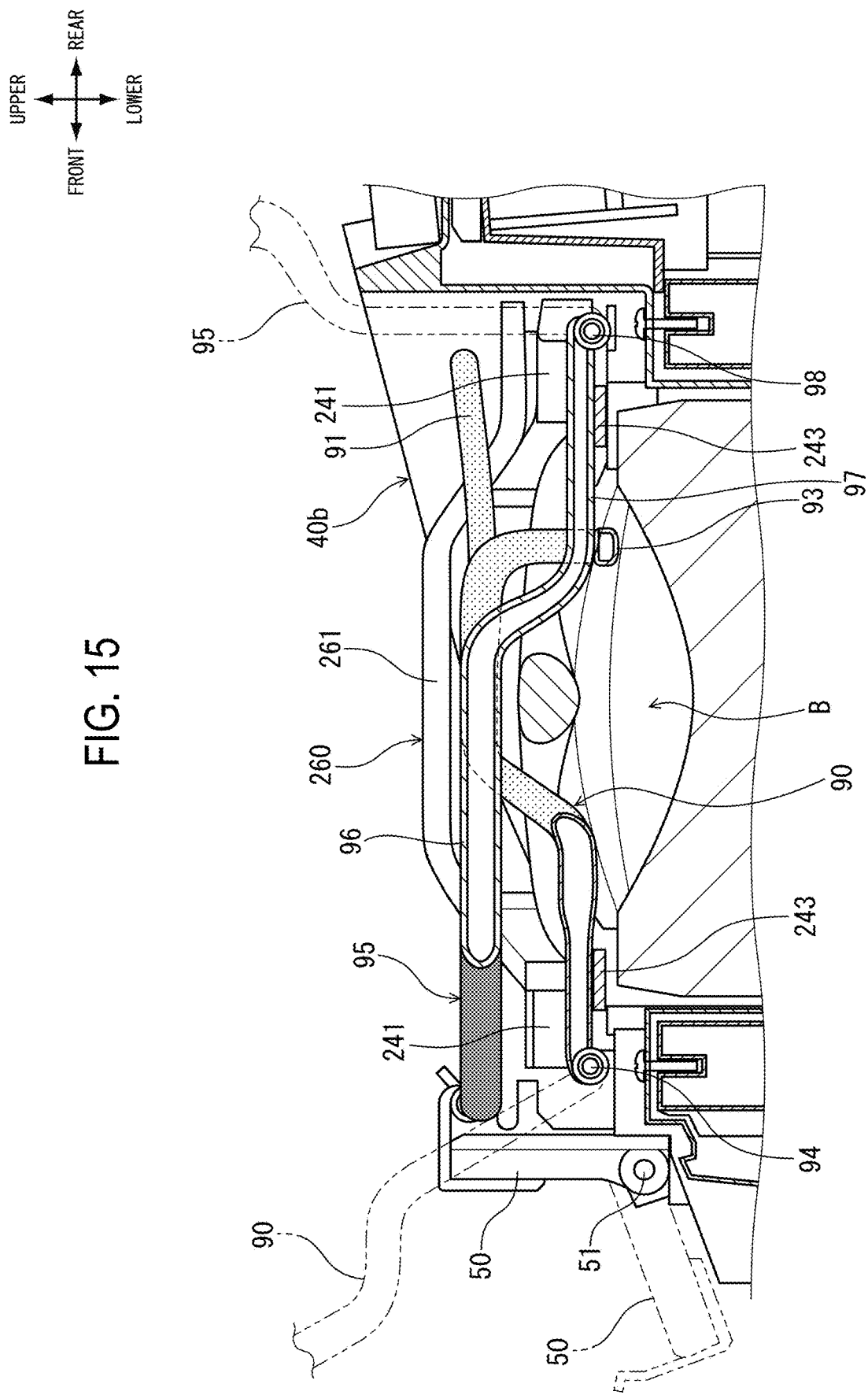
FIG. 15 is a partial cross-sectional left side view for showing a state in which the operation lever is held by the lock arms.

FIG. 14 is a perspective view for showing a configuration of lock arms 90 and 95 according to a second embodiment of the present invention. In addition, FIG. 15 is a partial cross-sectional left side view for showing a state in which an operation lever 260 is held by the lock arms 90 and 95. The embodiment is characterized in that the lock arms 90 and 95 for regulating the movement of the operation lever 260 towards the upper side of the vehicle body are provided, and the locking member 50 is configured to be engaged with the lock arms 90 and 95. Four pressing holders 241 that are swingable by a swing axis 242 are provided with pressing plates 243 extending outward in the vehicle width direction.

The front lock arm (stippled hatching part shown in the drawing) 90 is pivotally supported by a swing axis 94 positioned outside the front pressing holders 241 in the vehicle width direction. In addition, the front lock arm 90 is configured by coupling left and right curved arms 92 extending from the swing axis 94 to each other through a coupling pipe 91 directed in the vehicle width direction. Pressed portions 93 projecting outward in the vehicle width direction are provided at ends of the curved arms 92.

The rear lock arm (gray colored part shown in the drawing) 95 is pivotally supported by a swing axis 98 positioned outside the rear pressing holders 241 in the vehicle width direction. The rear lock arm 95 includes rising portions 97 extending from the swing axis 98 and a substantially U-shaped coupling arm 96 for coupling the left and right rising portions 97 to each other. The front lock arm 90 and the rear lock arm 95 can be configured using a pipe material made of metal, resin, or the like.

Referring to FIG. 15, in order to hold the operation lever 260 at the depressed position, if the front lock arm 90 is first swung towards the rear side of the vehicle body, the curved arms 92 of the front lock arm 90 are brought into contact with the pressing plates 243 provided at the pressing holders 241 on the front side of the vehicle body. Next, if the rear lock arm 95 is swung towards the front side of the vehicle body, the rising portions 97 of the rear lock arm 95 are brought into contact with the pressing plates 243 provided at the pressing holders 241 on the rear side of the vehicle body and are brought into contact with the pressed portions 93 of the front lock arm 90. The front and rear pressing holders 241 are accordingly pressed from above, and the front lock arm 90 is also pressed by the rear lock arm 95. At this time, the front lock arm 90 and the rear lock arm 95 are directed substantially in parallel with a grip part 261 of the operation lever 260.

In addition, the embodiment is configured in such a manner that when the locking member 50 pivotally supported by the upper-side case 40b is erected in the vertical direction, the locking member 50 is engaged with the coupling arm 96 of the rear lock arm 95 to regulate the swing of the rear lock arm 95. Accordingly, the rotational operation of the pressing holders 241 brought into contact with the upper surfaces of the batteries B can be inhibited, and the movement of the operation lever 60 towards the upper side of the vehicle body can be regulated by the coupling pipe 91 of the front lock arm 90 and the coupling arm 96 of the rear lock arm 95 which are positioned above the operation lever 260.

Note that the form of the electric motorcycle, the shapes and structures of the batteries and the battery case, the number and arrangement of the batteries, the shapes and structures of the battery-side terminal and the case-side terminal, the structure of the link mechanism, the shape and structure of the operation lever, the shape and structure of the locking member, the shapes and structures of the pressing holders, and the like are not limited to the above-described embodiments and can be variously changed. The battery attachment/detachment structure according to the present invention can be applied to saddle-ride type tricycle/quadricycle electric vehicles.

LIST OF REFERENCE SIGNS 1 saddle-ride type electric vehicle (electric motorcycle)
23 seat
39 hinge mechanism
29 housing part
40 battery case
41 pressing holder
44 seat catch mechanism
49 rubber member
50 locking member
52 engagement plate of locking member
52a engagement convex portion
61 grip part
64a engagement concave portion
54 spring hook (urging member)
60 operation lever
73 terminal holder
75 case-side terminal
78 battery-side terminal
80 seat bottom plate (bottom plate)
B battery

The invention claimed is:

1. A battery attachment/detachment structure for an electric motorcycle configured by including substantially rectangular parallelepiped batteries for supplying electric power to the electric motorcycle, a battery case in which the batteries are housed, a battery-side terminal provided on a bottom surface of each battery, and a case-side terminal engaged with the battery-side terminal,
wherein an operation lever for connecting or separating the battery-side terminal and the case-side terminal to/from each other by being operated in an up-and-down direction of a vehicle body, and a locking member for holding the operation lever at a position where the battery-side terminal and the case-side terminal are connected to each other are provided,
wherein the battery case is configured to be covered at an upper portion of a housing part of the batteries by closing an openable/closable seat on which an occupant sits,
wherein the locking member is configured to regulate a movement of the operation lever towards an upper side of the vehicle body by engaging with the operation lever, and
wherein in a state where the locking member is not engaged with the operation lever, a bottom plate of the seat is configured to interfere with the locking member so as not to close the seat.

2. The battery attachment/detachment structure for the electric motorcycle claim 1,
wherein the two batteries are housed next to each other in a vehicle width direction in the battery case,
wherein the operation lever is configured in such a manner that a grip part is positioned above and between the two batteries in a state where the batteries are housed in the battery case,
wherein swing pressing holders for pressing the upper surfaces of the batteries and a terminal holder for supporting the case-side terminal so as to be movable between a connection position connected to the battery-side terminal and a retreat position separated from the battery-side terminal are provided, and
wherein the batteries are accommodated in the battery case and the operation lever is pushed downward, so that the pressing holders are configured to be swung to press the upper surfaces of the batteries.

3. The battery attachment/detachment structure for the electric motorcycle according to claim 1,
wherein the locking member is provided with an engagement plate that is brought into contact with an upper surface of the operation lever when engaging with the operation lever, wherein an engagement convex portion is formed on a lower surface of the engagement plate, wherein an engagement concave portion in which the engagement convex portion is accommodated is formed on the upper surface of the operation lever, and wherein the locking member is configured to be swingable between a lock position engaged with the operation lever and an unlock position separated from the operation lever.

4. The battery attachment/detachment structure for the electric motorcycle according to claim 3, wherein a rubber member brought into contact with the locking member in the unlock position is attached to the bottom plate of the seat.

5. The battery attachment/detachment structure for the electric motorcycle according to claim 4, wherein a single urging member is attached to the locking member, and wherein the urging member applies an urging force for swinging the locking member to the lock position side in a range near the lock position, and applies an urging force for swinging the locking member to the unlock position side in a range near the unlock position.

6. The battery attachment/detachment structure for the electric motorcycle according to claim 4, wherein if the seat is closed when the locking member is in the lock position, a part of the bottom plate of the seat comes close to a front of a body of the locking member.

7. The battery attachment/detachment structure for the electric motorcycle according claim 4, wherein a seat catch mechanism for holding the seat in a closed state is arranged at a position near a rear side of a body of the battery case, and wherein the locking member is arranged near a front side of the body of the battery case and on a rear side of a body of a hinge mechanism of the seat.

8. The battery attachment/detachment structure for the electric motorcycle according to claim 4, wherein the two batteries are housed next to each other in a vehicle width direction in the battery case, wherein the operation lever is configured in such a manner that a grip part is positioned above and between the two batteries in a state where the batteries are housed in the battery case, wherein swing pressing holders for pressing the upper surfaces of the batteries and a terminal holder for supporting the case-side terminal so as to be movable between a connection position connected to the battery-side terminal and a retreat position separated from the battery-side terminal are provided, and wherein the batteries are accommodated in the battery case and the operation lever is pushed downward, so that the pressing holders are configured to be swung to press the upper surfaces of the batteries.

9. The battery attachment/detachment structure for the electric motorcycle according to claim 3, wherein the two batteries are housed next to each other in a vehicle width direction in the battery case, wherein the operation lever is configured in such a manner that a grip part is positioned above and between the two batteries in a state where the batteries are housed in the battery case, wherein swing pressing holders for pressing the upper surfaces of the batteries and a terminal holder for supporting the case-side terminal so as to be movable between a connection position connected to the battery-side terminal and a retreat position separated from the battery-side terminal are provided, and wherein the batteries are accommodated in the battery case and the operation lever is pushed downward, so that the pressing holders are configured to be swung to press the upper surfaces of the batteries.

10. The battery attachment/detachment structure for the electric motorcycle according to claim 3, wherein a single urging member is attached to the locking member, and wherein the urging member applies an urging force for swinging the locking member to the lock position side in a range near the lock position, and applies an urging force for swinging the locking member to the unlock position side in a range near the unlock position.

11. The battery attachment/detachment structure for the electric motorcycle according to claim 10, wherein if the seat is closed when the locking member is in the lock position, a part of the bottom plate of the seat comes close to a front of a body of the locking member.

12. The battery attachment/detachment structure for the electric motorcycle according claim 10, wherein a seat catch mechanism for holding the seat in a closed state is arranged at a position near a rear side of a body of the battery case, and wherein the locking member is arranged near a front side of the body of the battery case and on a rear side of a body of a hinge mechanism of the seat.

13. The battery attachment/detachment structure for the electric motorcycle according to claim 10, wherein the two batteries are housed next to each other in a vehicle width direction in the battery case, wherein the operation lever is configured in such a manner that a grip part is positioned above and between the two batteries in a state where the batteries are housed in the battery case, wherein swing pressing holders for pressing the upper surfaces of the batteries and a terminal holder for supporting the case-side terminal so as to be movable between a connection position connected to the battery-side terminal and a retreat position separated from the battery-side terminal are provided, and wherein the batteries are accommodated in the battery case and the operation lever is pushed downward, so that the pressing holders are configured to be swung to press the upper surfaces of the batteries.

14. The battery attachment/detachment structure for the electric motorcycle according to claim 3, wherein if the seat is closed when the locking member is in the lock position, a part of the bottom plate of the seat comes close to a front of a body of the locking member.

15. The battery attachment/detachment structure for the electric motorcycle according claim 14, wherein a seat catch mechanism for holding the seat in a closed state is arranged at a position near a rear side of a body of the battery case, and wherein the locking member is arranged near a front side of the body of the battery case and on a rear side of a body of a hinge mechanism of the seat.

16. The battery attachment/detachment structure for the electric motorcycle according to claim 14, wherein the two batteries are housed next to each other in a vehicle width direction in the battery case, wherein the operation lever is configured in such a manner that a grip part is positioned above and between the two batteries in a state where the batteries are housed in the battery case, wherein swing pressing holders for pressing the upper surfaces of the batteries and a terminal holder for supporting the case-side terminal so as to be movable between a connection position connected to the battery-side terminal and a retreat position separated from the battery-side terminal are provided, and wherein the batteries are accommodated in the battery case and the operation lever is pushed downward, so that the pressing holders are configured to be swung to press the upper surfaces of the batteries.

17. The battery attachment/detachment structure for the electric motorcycle according claim 3, wherein a seat catch mechanism for holding the seat in a closed state is arranged at a position near an rear side of the body of the battery case, and wherein the locking member is arranged near a front side of the body of the battery case and on a rear side of a body of a hinge mechanism of the seat.

18. The battery attachment/detachment structure for the electric motorcycle according to claim 1, wherein a seat catch mechanism for holding the seat in a closed state is arranged at a position near a rear side of a body of the battery case, and wherein the locking member is arranged near a front side of the body of the battery case and on a rear side of a body of a hinge mechanism of the seat.

19. The battery attachment/detachment structure for the electric motorcycle according to claim 18, wherein the two batteries are housed next to each other in a vehicle width direction in the battery case, wherein the operation lever is configured in such a manner that a grip part is positioned above and between the two batteries in a state where the batteries are housed in the battery case, wherein swing pressing holders for pressing the upper surfaces of the batteries and a terminal holder for supporting the case-side terminal so as to be movable between a connection position connected to the battery-side terminal and a retreat position separated from the battery-side terminal are provided, and wherein the batteries are accommodated in the battery case and the operation lever is pushed downward, so that the pressing holders are configured to be swung to press the upper surfaces of the batteries.

20. A battery attachment/detachment structure for an electric vehicle configured by including substantially rectangular parallelepiped batteries for supplying electric power to an electric vehicle, a battery case in which the batteries are housed, a battery-side terminal provided on a bottom surface of each battery, and a case-side terminal engaged with the battery-side terminal, wherein an operation lever for connecting or separating the battery-side terminal and the case-side terminal to/from each other by being operated in an up-and-down direction of a vehicle body, and a locking member for holding the operation lever at a position where the battery-side terminal and the case-side terminal are connected to each other are provided, wherein the battery case is configured to be covered at an upper portion of a housing part of the batteries by closing an openable/closable seat on which an occupant sits, wherein the locking member is configured to regulate a movement of the operation lever towards an upper side of the vehicle body by engaging with the operation lever, and wherein in a state where the locking member is not engaged with the operation lever, a bottom plate of the seat is configured to interfere with the locking member so as not to close the seat.

* * * * *